United States Patent [19]
Wallrafen

[11] Patent Number: 6,002,328
[45] Date of Patent: Dec. 14, 1999

[54] TANK DISPLAY SYSTEM AND METHOD FOR DETERMINING THE REMAINING VOLUME IN A TANK

[75] Inventor: Werner Wallrafen, Hofheim, Germany

[73] Assignee: VDO Adolf Schindling AG, Frankfurt, Germany

[21] Appl. No.: 08/820,134

[22] Filed: Mar. 14, 1997

[30]     Foreign Application Priority Data

Mar. 15, 1996  [DE]  Germany .................. 196 10 154

[51] Int. Cl.⁶ .................................................. B60Q 1/00
[52] U.S. Cl. .................. 340/450.2; 340/450; 340/618; 73/313
[58] Field of Search ................... 340/450.2, 450, 340/450.1, 618, 612, 620, 623, 619; 73/305, 311, 313; 137/1, 264, 265

[56]         References Cited

U.S. PATENT DOCUMENTS

| | | | |
|---|---|---|---|
| 4,194,396 | 3/1980 | Ohsawa et al. | 73/311 |
| 4,306,579 | 12/1981 | Kelly | 137/1 |
| 4,567,762 | 2/1986 | Hoppert et al. | 340/620 |
| 4,974,570 | 12/1990 | Szwargulski et al. | 123/509 |
| 5,298,881 | 3/1994 | Bowman | 340/450 |

*Primary Examiner*—Jeffery A. Hofsass
*Assistant Examiner*—Sihong Huang
*Attorney, Agent, or Firm*—Martin A. Farber

[57]          ABSTRACT

A tank display system for a tank filled with fuel, the tank being divided into a main tank and a supplementary tank, has a level limit switch which responds when the main tank is almost empty. If the switch gives off a signal, then a valve is opened, allowing fuel to flow from the supplementary tank into a flood cup of the main tank. Furthermore, this signal activates a unit for detection of fuel consumption, which unit calculates the remaining volume of fuel in the supplementary tank, which volume decreases as a result of the consumption of fuel. As starting volume for the calculation, the completely filled supplementary tank is used. The precise remaining volume of fuel is displayed.

20 Claims, 2 Drawing Sheets

TANK DISPLAY SYSTEM AND METHOD FOR DETERMINING THE REMAINING VOLUME IN A TANK

FIELD AND BACKGROUND OF THE INVENTION

The present invention relates to a tank display system for a fuel tank of a motor vehicle having a sensor which measures the level of fuel in the tank and a tank display which indicates this level of fuel. The fuel tank includes a main fuel tank, and a supplementary fuel tank from which the fuel can be emptied into the main tank when the main tank is almost empty. This invention furthermore relates to a method of determining the remaining volume in a fuel tank in which this volume is to be determined.

Such tank displays are known. In their case, the supplementary tank is not an independent part, but rather is formed by a region in the bottom of the main tank, in the manner that the tank has two outlets which are arranged at different heights. Each outlet can be connected to a fuel line by a valve which is developed as fuel switch and is operated by hand. When the tank is full, the upper outlet is to be connected to the fuel line. The region of the bottom of the tank can be connected to the fuel line via the lower outlet. This bottom region, which serves the function of a supplementary tank, contains a minimum volume of fuel which is measured to serve as reserve. Frequently, a sensor is arranged within the tank, with a float acting on a potentiometer, as a result of which the display field receives a signal and indicates the level of fuel present in the tank. In addition, when the minimum volume is reached, the driver is given a optical signal, for instance by means of a light on the display field. This optical signal serves to indicate that the fuel is down to the reserve state. The driver can, therefore, by means of the display for the level of the fuel and the light for the reserve state, estimate how much fuel is available to him. In modern motor vehicles, the display, however, is very inaccurate since the tank is made flatter and flatter and more and more angled and thus measurement of the height of filling leads to large inaccuracies. Thus, this estimate is very unsatisfactory even with a large amount of experience on the part of the driver and leads, particularly in the reserve state, to a great uncertainty as to the amount of fuel still available.

SUMMARY OF THE INVENTION

It is an object of the invention so to develop a tank display of the aforementioned type that when the reserve state is reached, regardless of the actual running condition, a minimum amount of fuel is independently and reliably available and is displayed. Furthermore, a method is to be developed for determining the precise volume remaining.

The first object is achieved in accordance with the invention in the manner that when a given low level is reached in the main tank (27) the sensor (10, 11, 21) gives off a signal by which the emptying of the supplementary tank (18) can be brought about and a warning device actuated. In this connection, the warning device can be an optical or acoustic warning device.

By this development, the specific minimum volume of the supplementary tank is available when the main tank is practically empty. Since the supplementary tank is filled first upon fueling, assurance is had that it is always full, so that when the reserve state is reached its full volume is available. The emptying of the fuel from the supplementary tank should take place when there is still a remaining amount of fuel in the main tank, i.e. when the latter is only almost empty. Otherwise, an interruption in the supply of fuel would lead to damage to a catalytic convertor in the case of modern motor vehicles. Aside from this, traffic could be obstructed or even endangered if the driving power of the motor vehicle were eliminated for a short time when the reserve state is reached.

Since with the tank display of the invention, the driver can rely thereon that at least the indicated volume of fuel is present in the reserve region, a separate spare can of gasoline need no longer be carried along with one. The tank display can thereby contribute to increased safety in the event of an accident and to a reduction in fuel emissions. Furthermore, space and weight in the trunk are save by the invention.

one advantageous further development of the tank display of the invention is that, due to the signal of the sensor (10, 11, 21), the start of a calculation of the instantaneous remaining volume of fuel (4) at the time based on fuel consumption values can be brought about by a unit (13) for detecting the consumption of fuel. In this way, the corresponding remaining volume of fuel in the tank, which decreases due to the consumption of the fuel, can be determined substantially more accurately than by means of a level sensor.

Modern motor vehicles frequently have a flood cup in the fuel tank. This flood cup serves to assure the supplying of the fuel upon traveling around curves or upon braking, since it suppresses sloshing of the fuel in the region of the outlet of the tank. It is then particularly advantageous for the accuracy of the tank display for the sensor to be a level sensor measuring the level in the fuel tank (1) and/or the liquid limit switch (11, 21) arranged in a flood cup of the main tank. The level limit switch is thus arranged at the position which is controlling for a sufficient supply of fuel to the engine. Such a level limit switch is particularly well suited for this further development of the invention since it can be set accurately to a switch point.

The consumption of fuel can be determined for instance based on the rate of flow. The tank display in modern motor vehicles is, however, more accurate in the reverse region if, in accordance with an advantageous further development of the invention, the unit (13) for detecting the consumption of fuel is developed so as to evaluate rejection pulses of an engine control electronics. In the case of diesel vehicles, the fuel consumption can be determined also via a control rod path.

Frequently, tank displays have only an analog display field with a very small space for the reserve. The accuracy of reading in the reverse region is substantially increased if, in accordance with a further development of the invention, the tank display has a first display field (5) for the entire region of the level of the fuel (4) and a second display field (8) which is connected when the main tank (27) is empty.

The supplementary tank (18) can be emptied by means of a valve (20) via which the supplementary tank (18) can be connected to a line leading to an intake side of the fuel pump (3). The fuel of the supplementary tank in that case, when the reserve condition is reached, flows directly to the fuel pump from the supplementary tank rather than from the main tank. In this case, it would no longer be necessary to arrange the supplementary tank above the main tank or to provide it with a separate fuel pump.

When the supplementary tank is located above the bottom of the main tank, it is advantageous for the supplementary tank (18) to be emptied by means of a valve (20) via which the supplementary tank (18) can be connected to the main tank (27). With such a development, the supplementary tank empties itself into the main tank or into the flood cup when the reverse condition is reached so that the fuel pump can draw in sufficient fuel.

The filling of the supplementary tank (18) is particulary simple from a structural standpoint if the supplementary tank can be filled via the tank inlet (24) of the main tank (27). The main tank is then filled upon overflow of the supplementary tank.

A particularly simple form of the supplementary tank (18) results when the supplementary tank is formed by a development in the bottom of the main tank (27) which development is substantially reduced in cross section as compared with the main tank (27). In such a case, the tank display of the invention can be obtained at particularly low expense.

In order to provide the drive with supplementary information with regard to the reserve region, it is advantageous if the second display field (5, 8) have a digital clear-text display. In this way, the driver can be informed, for instance by the display "supplementary tank connected" and possibly a warning sound that from now on the reserve volume is being used and the measurement of consumption and thus an indication of the reserve amount is taking place.

The assuring of a continuous filling of the supplementary tank is obtained when the supplementary tank (18) has an overflow valve which automatically closes when the supplementary tank is full. The overflow valve then prevents fuel from sloshing out of the supplementary tank.

As an alternative, sloshing of fuel out of the supplementary tank can also be prevented in the manner that slosh walls are provided in the supplementary tank (18). Slosh walls have the advantage over a valve that they do not have any moving parts.

In order to check the operation of the tank display, it is advantageous for a level limit switch (26, 25) to be arranged in the lower region and/or the upper region of the supplementary tank (18). In the event of the refueling of a small amount of fuel, the tank display can, for instance, recognize, by the lower level limit switch, the condition which could lead to an incorrect display and disconnect the display field or allow it to blink as a warning.

If an upper level limit switch is present, the correct display can be always assured, for instance in the event of a refueling which completely fills the supplementary tank.

An additional advantage which assures the correctness of the exact display of the display field results if a level sensor which continuously measures the level is arranged in the supplementary tank (18). In the event of the refueling of a small amount of fuel which does not fill the supplementary tank during the reserve region this refueling amount can be directed and added to the calculated remaining amount.

The invention also provides a method for determining a remaining volume in a fuel tank which has a sensor which measures the level of fuel and which consists of a main tank and an supplementary tank from which the fuel can be emptied via a valve when the main tank is practically empty, characterized by the fact that upon fueling, the supplementary tank is preferably always filled first and that, due to a signal of a sensor, when the main tank is almost empty, the valve is switched for removal of fuel from the supplementary tank.

The second problem mentioned, namely to develop a method for determining the remaining volume is solved, in accordance with the invention, in the manner that when the main tank is almost empty, the further removal of fuel takes place from the supplementary tank after the switching, and the remaining volume is determined by means of the consumption values of the internal combustion engine of the vehicle.

In this way, the remaining volume can be determined very easily and accurately. The determination of the consumption values can be effected rather simply and accurately in modern motor vehicles having injection systems by measuring the injection pulses. For a calculation of the remaining volume, there is required for this merely a fixed starting point, and a specifically defined volume in the filled supplementary tank. In this way, an exact display for the reserve region can be used in addition to a conventional display for the rest of the region. At the same time, when the main tank is practically empty, a spare fuel can need no longer be poured manually into the tank.

Possibly inaccuracies in the total tank display of the main tank can furthermore be eliminated in the manner that the characteristic curve of the fuel level sensor which measures the level in the main tank is automatically adapted to the remaining volume, upon the opening of the valve or the response of the level limit switch which starts the measurement of the consumption. This can be effected automatically by a zero-point adjustment.

The invention permits numerous embodiments.

BRIEF DESCRIPTION OF THE DRAWINGS

With the above and other objects and advantages in view, the present invention will become more clearly understood in connection with the detailed description of a preferred embodiment, when considered with the accompanying drawings, of which.

BRIEF DESCRIPTION OF THE PREFERRED EMBODIMENTS

Figure 1:
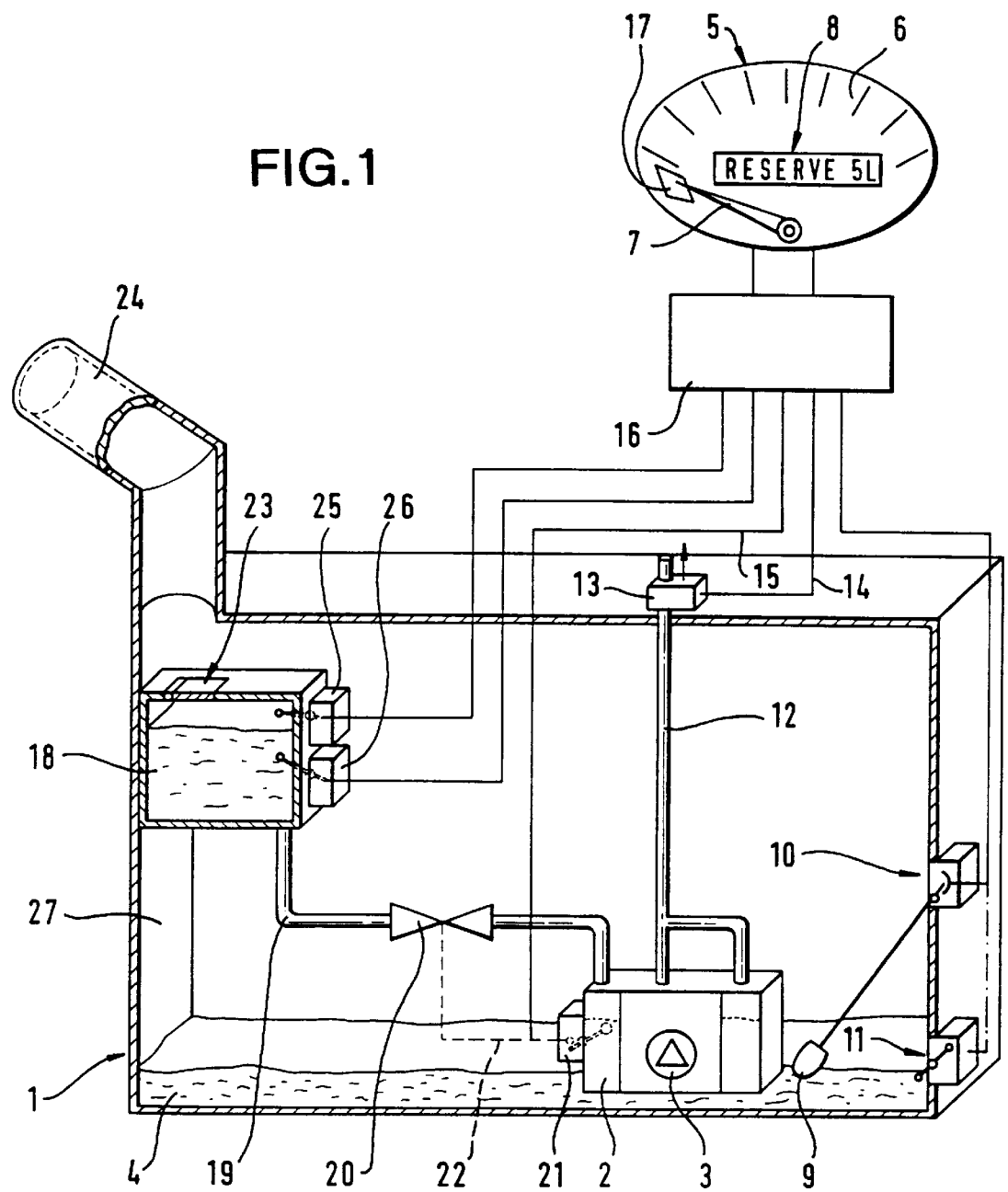
FIG. 1 shows a tank and fuel system, partially in section and partially diagrammatically, in accordance with the invention.

Referring now to the drawings, FIG. 1 shows a fuel tank 1 which includes a main tank 27 and a supplementary tank 18. Within the main tank 27 there is a flood cup 2, surrounded by fuel 4, with a fuel pump 3. An analog display field 5 having a scale 6 and a pointer 7 and a digital display field 8 together form a tank display. Within the fuel tank 1 a fuel level sensor 10 having a float 9 is arranged for measuring the entire filling region.

On the flood cup 2 there is level limit switch 21 which is able to control a valve 20 in a line 19. The line 19 leads from the supplementary tank 18 to the flood cup 2, and thus into the main tank 27. When the level limit switch 21 notes too low a level of fuel 4, the valve 20 is opened via a signal line 22. In this way, fuel 4 flows out of the supplementary tank 18 into the main tank 27. At the same time, the calculation of the remaining volume commence from the values of the fuel consumption. In order that no fuel sloshes on top out of the supplementary tank 18, a membrane valve 23 is fastened on its top side.

The signal for the opening of the valve 20 could be produced, instead of by the level limit switch 21, also by the level sensor 10 or by a level limit switch 11 which is arranged at a minimal height in the main tank 27.

The comparison of the analog display field 5 with the digital display field 8 shows that the digital display field 8 indicates a precise value at low heights of filling, while the pointer 7 of the analog display field 5 is then within a reserve region 17 of the scale 6.

The supplementary tank 18 is arranged directly below a tank connection 24. In this way, assurance is had that the supplementary tank 18 is filled first upon every fueling and that fuel 4 passes into the main tank 27 only after overflowing from the supplementary tank 18.

In order to determine whether the supplementary tank 18 is sufficiently full or completely empty, it is provided in its upper region with a level limit switch 25 and in its lower region also with a level limit switch 26.

Figure 2:
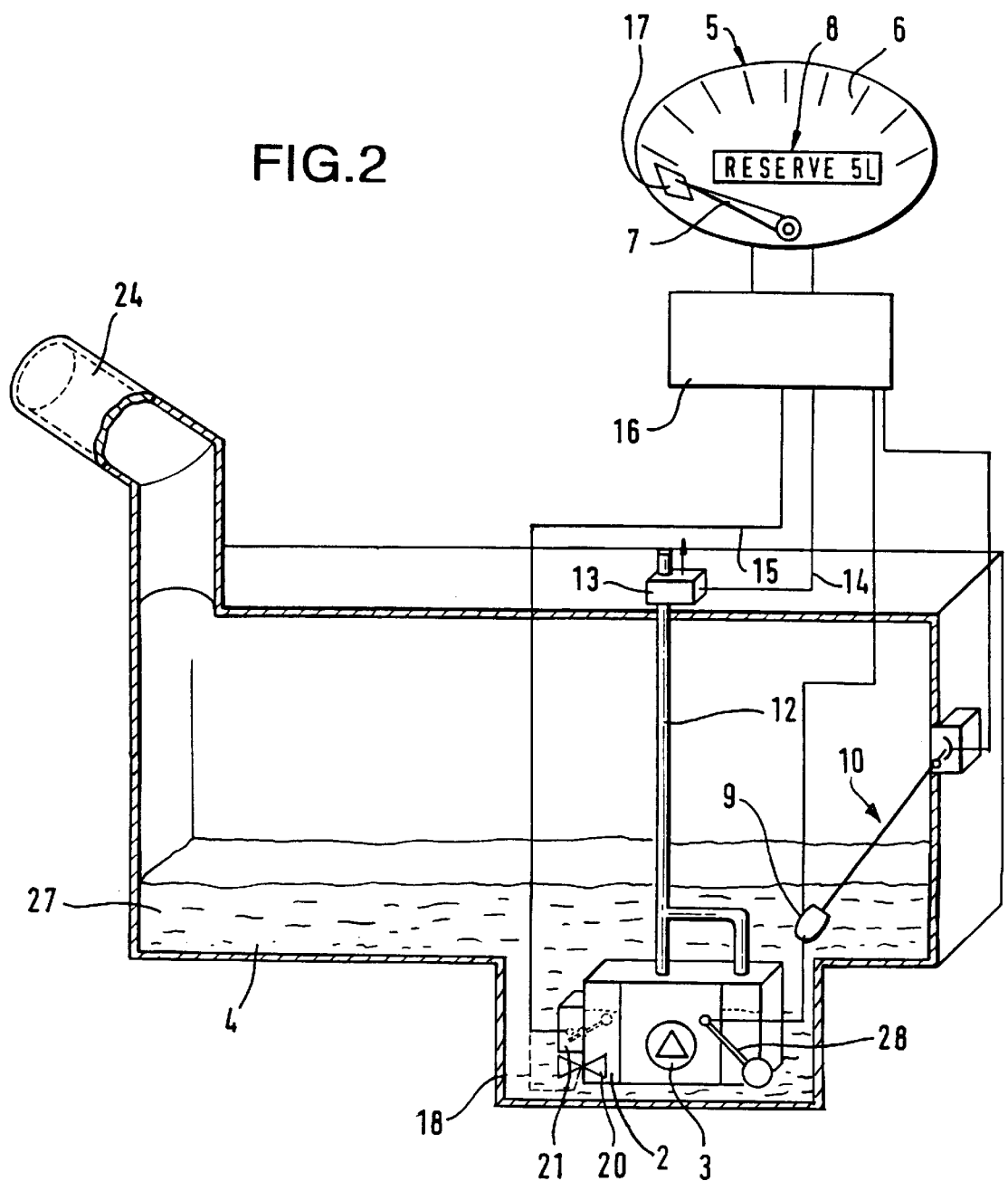
FIG. 2 shows a tank and fuel system similar to FIG. 1 in accordance with another embodiment of the invention.

From FIG. 2 a tank display system is known in which a supplementary tank 18 is formed by a development in the bottom of the main tank 27, which development is substantially reduced in cross section as compared with the main tank 27. Furthermore in the supplementary tank 18 a level sensor 28 is arranged which level sensor 28 continuously measures fuel level in the supplementary tank 18.

I claim:

1. A tank display system for a fuel tank of a motor vehicle, wherein the fuel tank is a composite tank including a main fuel tank, and a supplementary fuel tank from which the fuel is to be emptied into the main tank when the main tank is almost empty, the display system comprising:

a sensor which measures a level of fuel in the composite tank, and a tank display which indicates the level of fuel; and wherein, upon attainment of a given low level of fuel in the main tank, the sensor is operative to give off a signal directing an emptying of the supplementary tank, said signal providing fuel quantity to said display and being suitable for actuation of a warning device.

2. Display system according to claim 1, further comprising a detection unit for detecting consumption of the fuel;

wherein, upon the presence of said sensor signal, the detection unit initiates a calculation of an instantaneous remaining volume of fuel based on fuel consumption values.

3. Display system according to claim 2, wherein the detection unit is operative to evaluate injection pulses of an engine control electronics.

4. Display system according to claim 1, wherein the sensor is a level sensor measuring the level of fuel in the composite fuel tank.

5. A display system according to claim 4, further comprising a limit switch disposed within a flood cap of the main tank for initiating a flow of fuel from the supplementary fuel tank to the main fuel tank.

6. Display system according to claim 1, wherein, the tank display has a first display field for indicating an amount of the fuel in the composite tank and a second display field to indicate consumption of fuel from the supplementary tank, the second display field becoming operative upon an emptying of the main tank.

7. Display system according to claim 6, wherein the second display field has a digital clear-text display to present supplementary information relative to the amount of fuel remaining in the supplementary tank.

8. Display system according to claim 1, further comprising a valve and a fuel pump;

wherein fuel in the supplementary tank is withdrawn by means of the valve and fed via a line leading to an intake side of the fuel pump.

9. Display system according to claim 8, wherein said valve enables the supplementary tank to be emptied, said valve serving to connect the supplementary tank to the main tank.

10. Display system according to claim 1, wherein the main tank has a fuel inlet, and the supplementary tank is filled via the fuel inlet of the main tank.

11. Display system according to claim 1, wherein the supplementary tank is formed by a development in the bottom of the main tank, which development is substantially reduced in cross section as compared with the main tank.

12. Display system according to claim 1, wherein the supplementary tank has an overflow valve which automatically closes when the supplementary tank is full.

13. Display system according to claim 1, wherein slosh walls are provided in the supplementary tank.

14. Display system according to claim 1, further comprising a level limit switch in the supplementary tank, the level limit switch being arranged in the lower region or the upper region of the supplementary tank.

15. Display system according to claim 1, further comprising level limit switches in the supplementary tank, the level limit switches being arranged in the lower region and the upper region of the supplementary tank.

16. Display system according to claim 1, further comprising a level sensor which continuously measures fuel level and is located in the supplementary tank.

17. A display system according to claim 1, further comprising a limit switch disposed within a flood cup of the main tank for initiating a flow of fuel from the supplementary fuel tank to the main fuel tank.

18. A method for determining a remaining volume in a fuel tank which has a sensor which measures the level of fuel, comprising the steps of:

constructing the tank as a composite tank of a main tank and a supplementary tank;

withdrawing fuel via a valve from the supplementary tank upon attaining a state of near emptiness;

wherein, during a fueling operation, filling the supplementary tank prior to a filling of the main tank; and upon the presence of a signal emitted by the sensor, when the main tank is almost empty, switching the valve for removal of fuel from the supplementary tank.

19. A method according to claim 18, wherein after said switching of the valve, there is a step of determining a remaining volume of fuel in the supplementary tank from fuel consumption values of an internal combustion engine of a vehicle carrying the composite fuel tank.

20. A method according to claim 19, further comprising a step of:

adapting a characteristic curve of the fuel sensor which measures the level in the main tank upon the opening of the valve or in response to a fuel level limit switch which starts a measurement of the consumption to the remaining fuel volume.

* * * * *